(12) United States Patent
Tu et al.

(10) Patent No.: US 10,505,388 B2
(45) Date of Patent: Dec. 10, 2019

(54) POWER CONVERTING DEVICE AND CONTROL METHOD THEREOF FOR PROVIDING BACKUP POWER SOURCE

(71) Applicant: DELTA ELECTRONICS, INC., Taoyuan (TW)

(72) Inventors: Kuan-Hsien Tu, Taoyuan (TW); Yung-Wei Peng, Taoyuan (TW); So-Huan Chiang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 203 days.

(21) Appl. No.: 15/375,181

(22) Filed: Dec. 12, 2016

(65) Prior Publication Data
US 2017/0366043 A1    Dec. 21, 2017

(30) Foreign Application Priority Data
Jun. 17, 2016   (TW) .............................. 105119065 A

(51) Int. Cl.
| | |
|---|---|
| *H02J 9/06* | (2006.01) |
| *H02J 7/00* | (2006.01) |
| *H02M 7/04* | (2006.01) |
| *H02M 7/12* | (2006.01) |

(52) U.S. Cl.
CPC ............ *H02J 9/061* (2013.01); *H02J 7/0068* (2013.01); *H02M 7/04* (2013.01); *H02M 7/12* (2013.01)

(58) Field of Classification Search
CPC .......... H02J 9/061; H02J 7/0068; H02M 7/12; H02M 7/04
See application file for complete search history.

(56) References Cited

U.S. PATENT DOCUMENTS

| | | | | |
|---|---|---|---|---|
| 5,990,577 A  * | 11/1999 | Kamioka | .............. | H02J 7/0052 307/26 |
| 6,465,913 B1 * | 10/2002 | Nagai | ................... | H02J 7/0068 307/112 |
| 8,035,251 B2 * | 10/2011 | Lai | .......................... | H02J 9/062 307/46 |
| 8,648,494 B2 * | 2/2014 | Chiang | ................... | H02J 9/061 307/64 |
| 2013/0328401 A1* | 12/2013 | Chen | ....................... | H02J 9/061 307/64 |

(Continued)

FOREIGN PATENT DOCUMENTS

| | | |
|---|---|---|
| CN | 103904767 B | 2/2016 |
| TW | I415366 B | 11/2013 |

(Continued)

*Primary Examiner* — Jared Fureman
*Assistant Examiner* — Michael J Warmflash
(74) *Attorney, Agent, or Firm* — CKC & Partners Co., LLC

(57) ABSTRACT

A power converting device includes an AC/DC converter, a switch, and a controlling unit. The AC/DC converter converts AC power into a DC voltage, and provides the DC voltage to a load. The switch is coupled to a backup power source. The controlling unit receives the DC voltage. If the DC voltage is less than a predetermined voltage or a decrease of the DC voltage is greater than a predetermined percentage of the DC voltage and the controlling unit receives a voltage command signal of the backup power source, the controlling unit turns on the switch for providing the backup power source to the load.

21 Claims, 6 Drawing Sheets

(56) References Cited

U.S. PATENT DOCUMENTS

| | | | | |
|---|---|---|---|---|
| 2014/0183958 A1* | 7/2014 | Yeh | ............... | H02J 9/062 |
| | | | | 307/66 |
| 2014/0328098 A1* | 11/2014 | Hosotani | ............ | H02M 3/33507 |
| | | | | 363/89 |
| 2015/0069842 A1* | 3/2015 | Niu | ............... | H02J 9/061 |
| | | | | 307/64 |

FOREIGN PATENT DOCUMENTS

| | | |
|---|---|---|
| TW | 201511445 A | 3/2015 |
| TW | M522512 U | 5/2016 |

\* cited by examiner

POWER CONVERTING DEVICE AND CONTROL METHOD THEREOF FOR PROVIDING BACKUP POWER SOURCE

RELATED APPLICATIONS

This application claims priority to Taiwan Application Serial Number 105119065, filed Jun. 17, 2016, which is herein incorporated by reference.

BACKGROUND

Field of Invention

The present disclosure relates to a converting device and a control method thereof. More particularly, the present disclosure relates to a power converting device and a control method thereof.

Description of Related Art

A prior art uninterrupted power supply system detects a grid signal to determine whether there is a grid power outage or not, and then outputs backup power to the load for use. However, when the uninterrupted power supply system switches the power supply source from the grid to the backup power source, the time required by the backup power source to supply power to the load is too long, which in turn causes a power outage during the switching process of the uninterrupted power supply system. As a result, the demand of uninterrupted supply of power cannot be really achieved.

For the forgoing reasons, there is a need to solve the above-mentioned problem by providing a power converting device and a control method thereof.

SUMMARY

The summary aims to provide a brief description of the disclosure so that readers can understand the disclosure fundamentally. The summary does not describe the disclosure completely, and does not intend to specify the important/critical elements of the embodiments of the present disclosure or limit the scope of the present disclosure.

A power converting device is provided. The power converting device comprises an AC/DC converter, a switch, and a controlling unit. The AC/DC converter converts AC power to a DC voltage, and provides the DC voltage to a load. The switch is coupled to a backup power source. The controlling unit receives the DC voltage. If the DC voltage is less than a predetermined voltage or a decrease of the DC voltage is greater than a predetermined percentage of the DC voltage and the controlling unit receives a voltage command signal of the backup power source, the controlling unit turns on the switch for providing the backup power source to the load.

The disclosure provides a control method of a power converting device. The control method comprises the following steps: converting AC power into a DC voltage and providing the DC voltage to a load by an AC/CD converter; determining whether or not the DC voltage is less than a predetermined voltage or determining whether or not a decrease of the DC voltage is greater than a predetermined percentage of the DC voltage by a controlling unit; and turning on a switch by the controlling unit for providing a backup power source to the load if the controlling unit determines that the DC voltage is less than the predetermined voltage or the decrease of the DC voltage is greater than the predetermined percentage of the DC voltage and the controlling unit receives a voltage command signal of the backup power source.

Therefore, the power converting device and the control method thereof according to the embodiments of the present disclosure judge the status of the DC voltage output by the AC/DC converter to determine whether or not to perform switching so as to provide the backup power source to the load for use. Therefore, time required by the backup power source to supply power to the load is approximately zero to meet the demand of uninterrupted supply of power. In addition, according to the power converting device and the control method thereof, the switch will not be turned on for providing the backup power source to the load until the voltage command signal of the backup power source is received. As a result, it is further ensured that the voltage of the backup power source is within the normal range without damaging the load.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

According to the usual mode of operation, various features and elements in the figures have not been drawn to scale, which are drawn to the best way to present specific features and elements related to the disclosure. In addition, among the different figures, the same or similar elements symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

As used herein, "couple" refers to direct physical contact or electrical contact or indirect physical contact or electrical contact between two or more elements. Or it can also refer to reciprocal operations or actions between two or more elements.

Figure 1:
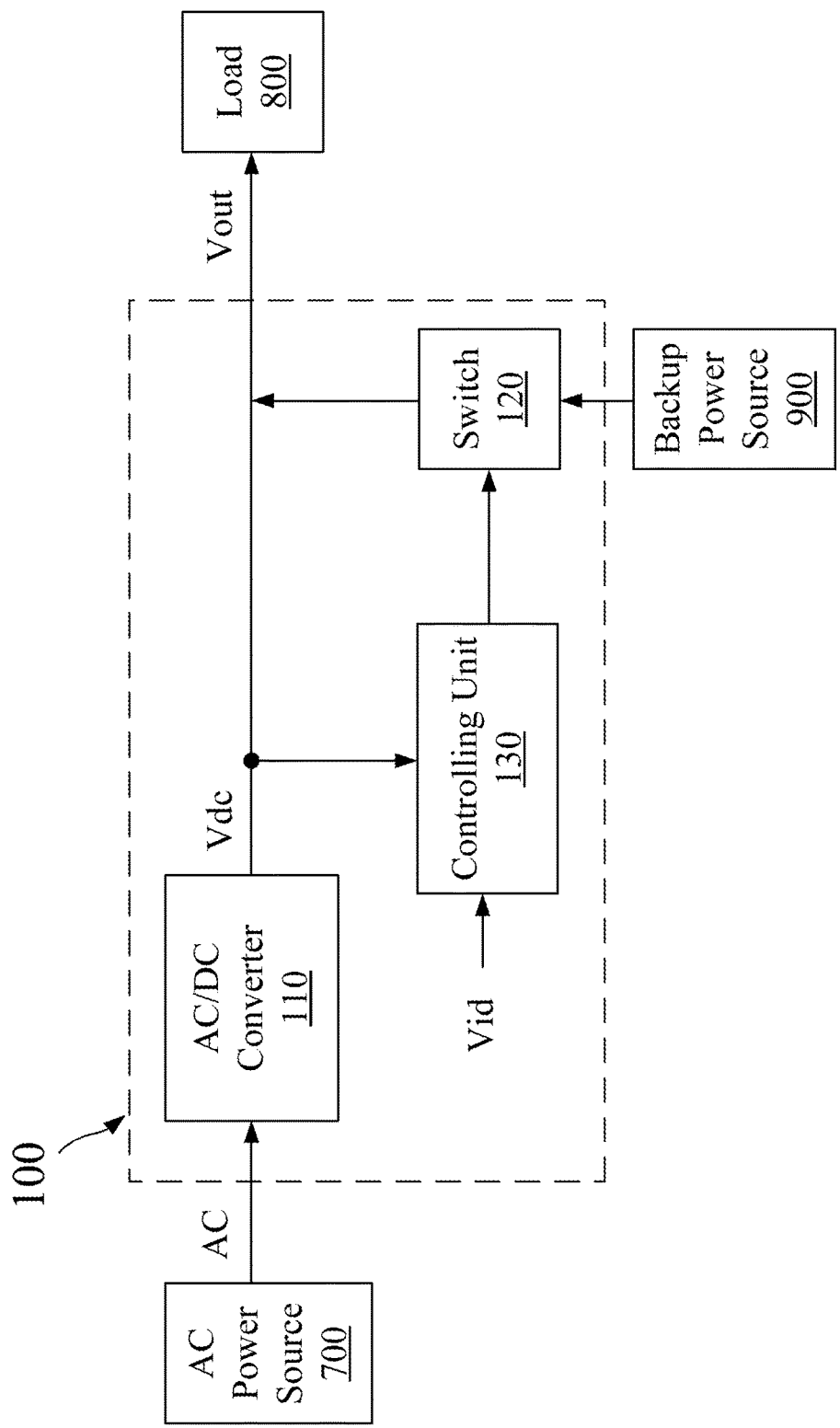
FIG. 1 depicts a schematic diagram of a power converting device according to one embodiment of this disclosure.

FIG. 1 depicts a schematic diagram of a power converting device 100 according to one embodiment of this disclosure. As shown in FIG. 1, the power converting device 100 comprises an alternating current/direct current (AC/DC) converter 110, a switch 120, and a controlling unit 130. The AC/DC converter 110 is coupled to an alternating-current (AC) power source 700 for receiving AC power from the AC power source 700, and the AC/DC converter 110 converts the AC power into a direct-current (DC) voltage Vdc and provides the DC voltage Vdc to a load 800. The switch 120 is coupled to a backup power source 900. In one embodiment, an initial state of the switch 120 is preset as a turn-off state, that is, the backup power source 900 is not provided to the load 800 in the beginning.

The controlling unit 130 receives the DC voltage Vdc. If the DC voltage Vdc is less than a predetermined voltage or a decrease of the DC voltage Vdc is greater than a predetermined percentage of the DC voltage Vdc and the controlling unit 130 receives a voltage command signal Vid of the backup power source 900, the controlling unit 130 turns on the switch 120 for providing the backup power source 900 to the load 800. For example, the controlling unit 130 receives the DC voltage Vdc and makes a judgment on its value. If the DC voltage Vdc is less than the predetermined voltage or the decrease of the DC voltage Vdc is greater than 10% of the DC voltage Vdc and the controlling unit 130 receives the voltage command signal Vid that indicates a voltage of the backup power source 900 to be normal, the controlling unit 130 turns on the switch 120 for providing the backup power source 900 to the load 800 through the switch 120.

In one embodiment, it is assumed that a rated voltage of the DC voltage Vdc output by the AC/DC converter 110 may be but not limited to 20 volts (V). Based on this, the predetermined voltage is set as 18V. When the AC power source 700 normally provides the AC power AC to the AC/DC converter 110, the AC/DC converter 110 normally outputs the DC voltage Vdc of approximately 20 V correspondingly. Once the AC power source 700 has a power outage, the controlling unit 130 immediately determines that the DC voltage Vdc is less than the predetermined voltage, which is 18V, when the AC/DC converter 110 correspondingly outputs the DC voltage Vdc of approximately 17 V at a moment of power outage. If at this time the controlling unit 130 also receives the voltage command signal Vid that indicates the voltage of the backup power source 900 to be normal, the controlling unit 130 immediately turns on the switch 120 for providing the backup power source 900 to the load 800 through the switch 120. On the other hand, at the moment of power outage, the controlling unit 130 immediately determines that the decrease of the DC voltage Vdc (3V) is greater than 10% of the rated voltage of the DC voltage Vdc (2V) when the AC/DC converter 110 correspondingly outputs the DC voltage Vdc of approximately 17 V. At this time, if the controlling unit 130 also receives the voltage command signal Vid that indicates the voltage of the backup power source 900 to be normal, the controlling unit 130 immediately turns on the switch 120 for providing the backup power source 900 to the load 800 through the switch 120.

The power converting device 100 according to the present embodiment judges a status of the DC voltage Vdc output by the AC/DC converter 110 to determine whether or not to perform switching so as to provide the backup power source 900 to the load 800 for use. Therefore, time required by the backup power source 900 to supply power to the load 800 is approximately zero to meet the demand of uninterrupted supply of power. In addition, the controlling unit 130 will not turn on the switch 120 for providing the backup power source 900 to the load 800 until receiving the voltage command signal Vid of the backup power source 900. As a result, it is further ensured that the voltage of the backup power source 900 is within a normal range without damaging the load 800.

Figure 2:
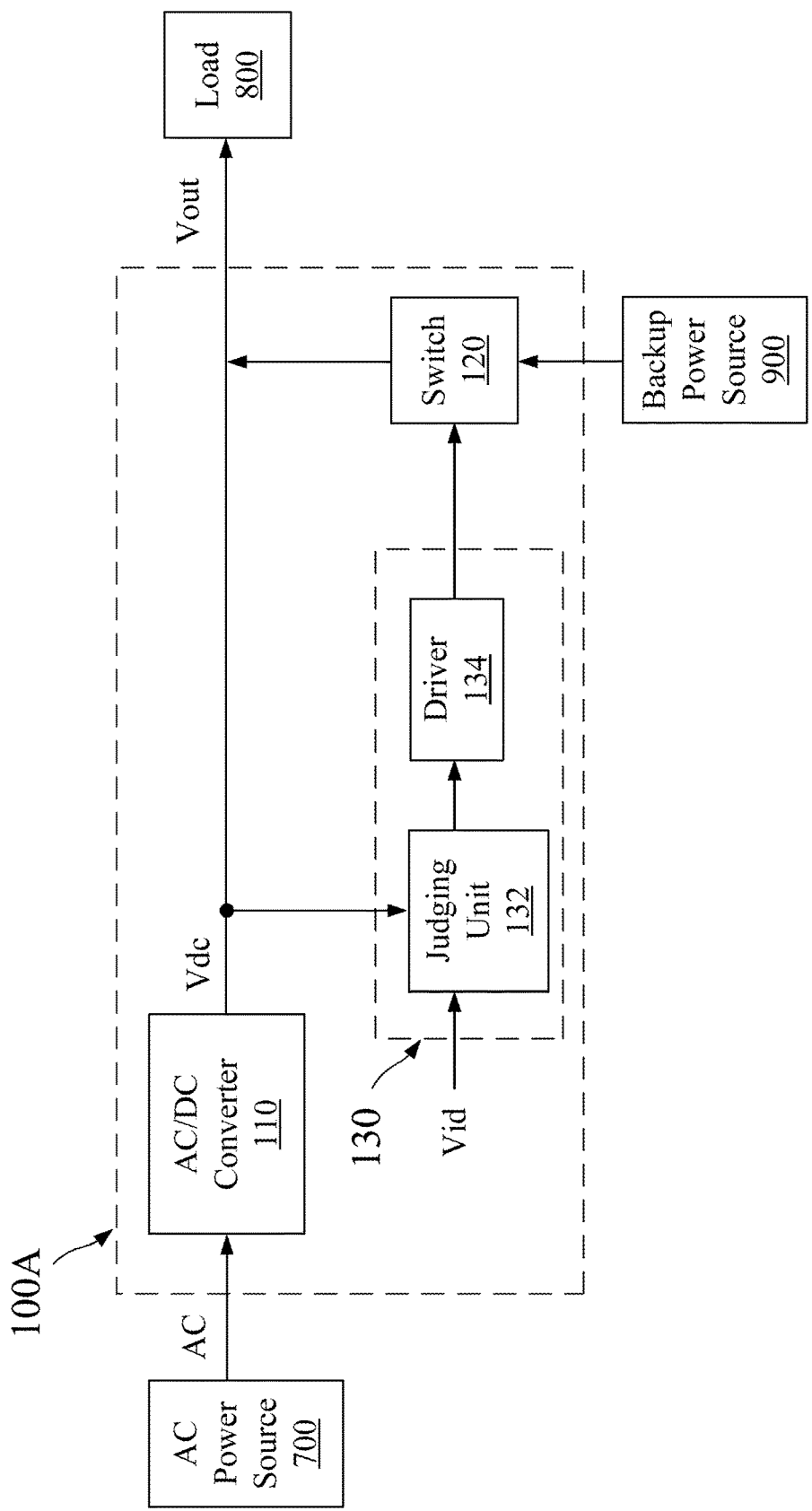
FIG. 2 depicts a schematic diagram of detailed circuit blocks of a controlling unit of the power converting device in FIG. 1 according to another embodiment of this disclosure.

FIG. 2 depicts a schematic diagram of detailed circuit blocks of the controlling unit 130 of the power converting device 100 in FIG. 1 according to another embodiment of this disclosure. As shown in FIG. 2, the controlling unit 130 of a power converting device 100A comprises a judging unit 132 and a driver 134. The judging unit 132 makes a judgment on the DC voltage Vdc. If the DC voltage Vdc is less than the predetermined voltage or the decrease of the DC voltage Vdc is greater than the predetermined percentage of the DC voltage Vdc and the judging unit 132 receives the voltage command signal Vid, the judging unit 132 outputs a judging signal to the driver 134. The driver 134 receives the judging signal and outputs a drive signal to the switch 120 according to the judging signal. The switch 120 is turned on according to the drive signal for providing the backup power source 900 to the load 800. However, the present disclosure is not limited to FIG. 2, which is only an example for illustrating one of the implementations of the present disclosure.

Figure 3:
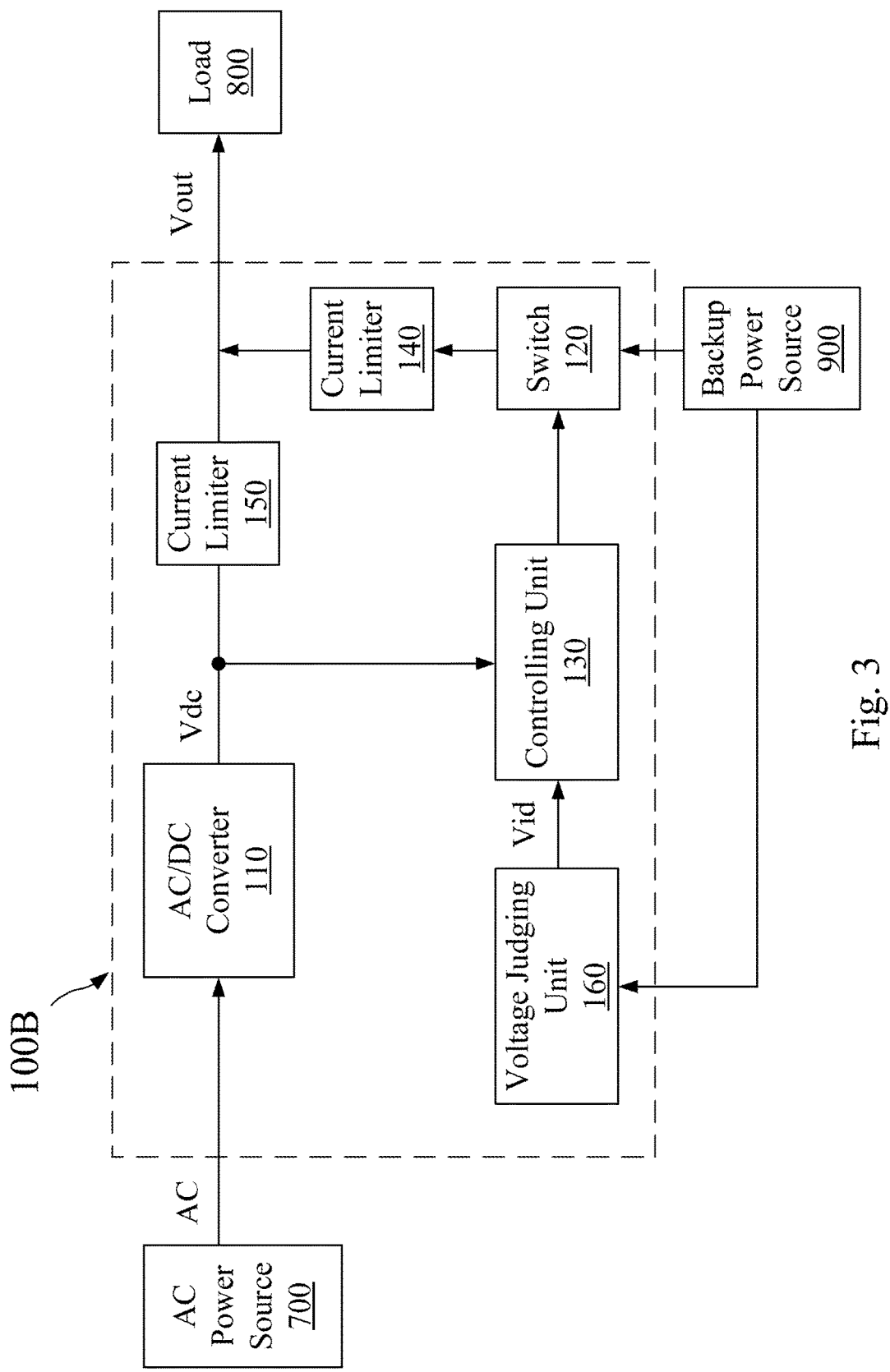
FIG. 3 depicts a schematic diagram of a power converting device according to one embodiment of this disclosure.

FIG. 3 depicts a schematic diagram of a power converting device 100B according to one embodiment of this disclosure. As compared with the power converting device 100 shown in FIG. 1, the power converting device 100B further comprises a current limiter 140. The current limiter 140 is coupled between the switch 120 and an output terminal of the AC/DC converter 110 and used for preventing the AC/DC converter 110 from supplying power to the backup power source 900 through the switch 120. The situation that the AC/DC converter 110 charges the backup power source 900 through the switch 120 when the AC power source 700 normally supplies power, which causes damages to the backup power supply 900, is thus avoided.

In one embodiment, the power converting device 100B in FIG. 3 further comprises a current limiter 150. The current limiter 150 is coupled between the switch 120 and the output terminal of the AC/DC converter 110 and used for preventing the backup power source 900 from supplying power to the AC/DC converter 110 or the controlling unit 130 through the switch 120. The situation that the backup power source 900 supplies extra power to the AC/DC converter 110 or the controlling unit 130 through the switch 120 when the AC power source 700 has a power outage so the backup power source 900 is used for supplying power, which causes power consumption of the backup power source 900, is thus avoided. As a result, since the power consumption of the backup power source 900 is reduced, an emergency power supply time of the backup power source 900 can be increased correspondingly when the power outage occurs.

In another embodiment, the power converting device 100B in FIG. 3 further comprises a voltage judging unit 160. The voltage judging unit 160 detects the voltage of the backup power source 900. If the voltage of the backup power source 900 is within a range of threshold voltages, the voltage judging unit 160 outputs the voltage command signal Vid to the controlling unit 130 to indicate that the backup power source 900 is in a normal state. The controlling unit 130 will not turn on the switch 120 for providing the backup power source 900 to the load 800 until detecting that the DC voltage Vdc decreases abnormally and receiving the voltage command signal Vid which indicates the backup power source 900 to be normal. As a result, it is further ensured that the voltage of the backup power source 900 is within the normal range and will not damage the load 800. In one embodiment, the backup power source 900 may be a battery. However, the backup power source 900 is not limited to the battery and may be implemented by using some other element that can provide electric power depending on practical needs. Additionally, the present disclosure is not limited to FIG. 3, which is only an example for illustrating one of the implementations of the present disclosure.

Figure 4:
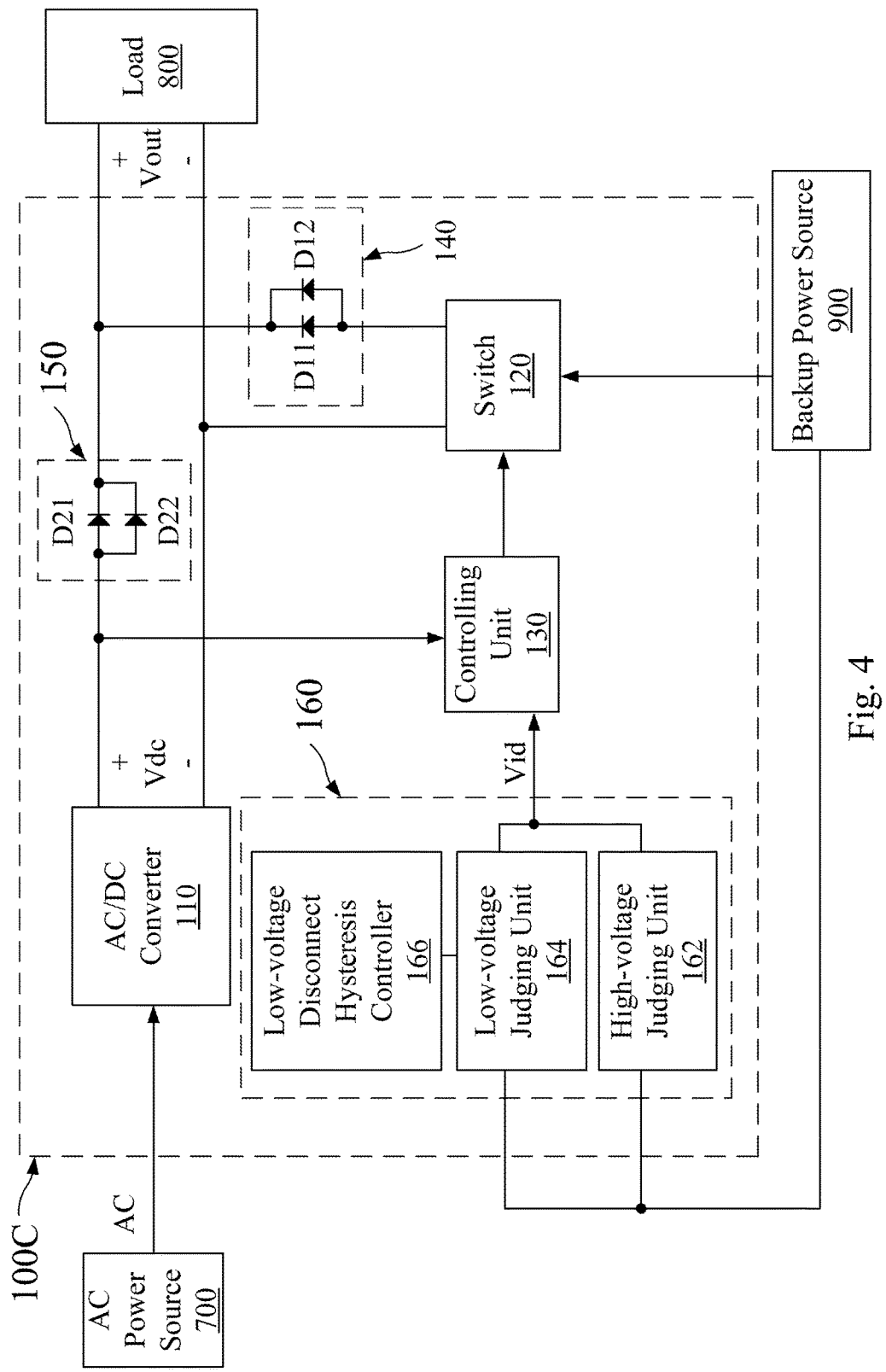
FIG. 4 depicts a schematic diagram of a detailed circuit of the power converting device in FIG. 3 according to another embodiment of this disclosure.

FIG. 4 depicts a schematic diagram of a detailed circuit of the power converting device 100B in FIG. 3 according to another embodiment of this disclosure. As shown in FIG. 4, the current limiter 140 may be implemented by using a diode but is not limited thereto. For example, the current limiter 140 may be implemented by using a diode D11. An anode terminal of the diode D11 is coupled to the switch 120, and a cathode terminal of the diode D11 is coupled to the output terminal of the AC/DC converter 110. With such a configuration, the AC/DC converter 110 can be prevented from supplying power to the backup power source 900 through the switch 120, thus avoiding damages to the backup power source 900. In another embodiment, the current limiter 140 may be implemented by using the diode D11 and a diode D12, and they can be coupled in parallel.

In one embodiment, the current limiter 150 may be implemented by using a diode but is not limited thereto. For example, the current limiter 150 may be implemented by using a diode D21. An anode terminal of the diode D21 is coupled to the output terminal of the AC/DC converter 110, and a cathode terminal of the diode D21 is coupled to the switch 120. With such a configuration, the backup power source 900 can be prevented from supplying power to the AC/DC converter 110 or the controlling unit 130 through the switch 120, thus avoiding power consumption of the backup power source 900. As a result, the emergency power supply time of the backup power source 900 is increased. In another embodiment, the current limiter 150 may be implemented by using the diode D21 and a diode D22, and they can be coupled in parallel. However, the present disclosure is not limited to FIG. 4, which is only an example for illustrating one of the implementations of the present disclosure. In addition, the current limiters 140, 150 may be implemented by using some other element that can prevent the current from flowing or limit the current direction depending on practical needs.

In still another embodiment, the voltage judging unit 160 comprises a high-voltage judging unit 162 and a low-voltage judging unit 164. The high-voltage judging unit 162 and the low-voltage judging unit 164 are both coupled to the backup power source 900. The high-voltage judging unit 162 is configured to determine whether or not the voltage of the backup power source 900 exceeds a predetermined upper limit value of the range of threshold voltages. The low-voltage judging unit 164 is configured to determine whether or not the voltage of the backup power source 900 is lower than a predetermined lower limit value of the range of threshold voltages. After the judgment, if the voltage of the backup power source 900 does not exceed the predetermined upper limit value and is not lower than the predetermined lower limit value, the voltage judging unit 160 outputs the voltage command signal Vid to the controlling unit 130 so as to indicate that the backup power source 900 is in the normal state. In one embodiment, if the voltage of the backup power source 900 exceeds the predetermined upper limit value or is lower than the predetermined lower limit value, it is indicated that the backup power source 900 is in an abnormal state. The voltage judging unit 160 does not output the voltage command signal Vid to the controlling unit 130. When the controlling unit 130 does not receive the voltage command signal Vid, the controlling unit 130 turns off the switch 120 and does not provide the backup power source 900 to the load 800 so as to avoid the damages to the load 800 caused by an excessively high voltage or an excessively low voltage of the backup power source 900. In one embodiment, the backup power source 900 may be a battery. However, the backup power source 900 is not limited to the battery and may be implemented by using some other element that can provide electric power depending on practical needs.

In another embodiment, the voltage judging unit 160 comprises a low-voltage disconnect hysteresis controller 166. The low-voltage disconnect hysteresis controller 166 is coupled to the low-voltage judging unit 164 for continuously outputting the voltage command signal Vid when the voltage of the backup power source 900 is within a buffer range lower than the predetermined lower limit value. The controlling unit 130 is thus allowed to continuously turn on the switch 120 for providing the backup power source 900 to the load 800. In one embodiment, the backup power source 900 may be a battery. Since the battery is characterized by an internal resistance, a voltage of the battery is reduced during a discharge process. However, when the battery stops discharging, the voltage of the battery will rise. This battery characteristic is not taken into account when designing the prior art uninterrupted power supply system. Hence, after the battery is discharged to a low voltage and cannot supply power, a judgment is made to supply power again. The oscillation phenomenon resulting from the continuous turning off and turning on of the battery causes the load to turn on and turn off repeatedly. In view of this, the present disclosure designs a buffer range to avoid the oscillation phenomenon resulting from the continuous turning off and turning on of the battery by using the low-voltage disconnect hysteresis controller 166.

Figure 5:
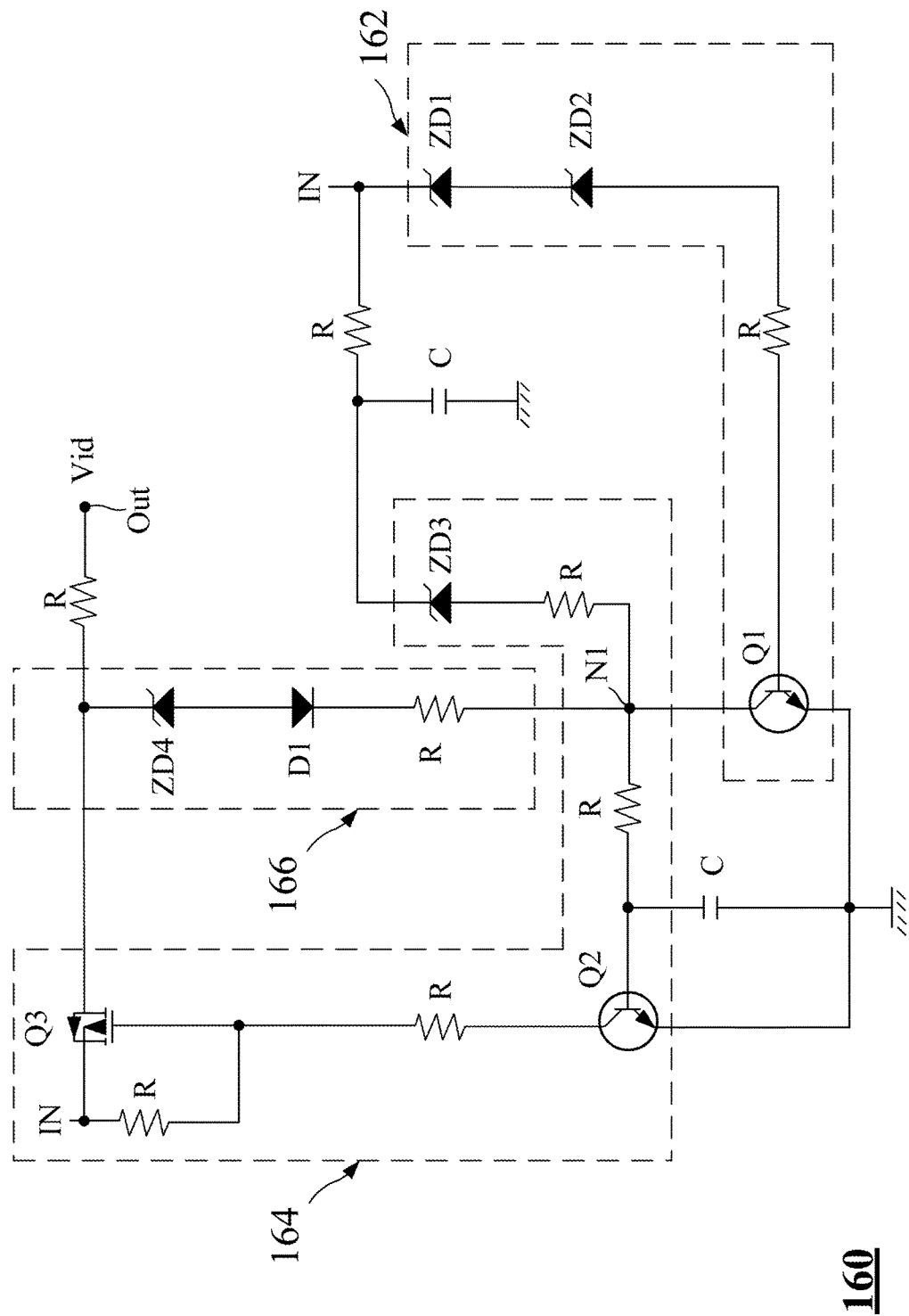
FIG. 5 depicts a schematic diagram of a detailed circuit of a voltage judging unit of a power converting device in FIG. 4 according to another embodiment of this disclosure.

FIG. 5 depicts a schematic diagram of a detailed circuit of the voltage judging unit 160 of a power converting device 100C in FIG. 4 according to another embodiment of this disclosure. As shown in FIG. 5, the high-voltage judging unit 162 comprises a first zener diode ZD1, a second zener diode ZD2, and a first transistor Q1. A cathode terminal of the first zener diode ZD1 is coupled to the backup power source 900 through a terminal IN. A cathode terminal of the second zener diode ZD2 is coupled to an anode terminal of the first zener diode ZD1. A control terminal of the first transistor Q1 is coupled to an anode terminal of the second zener diode ZD2, and a first terminal of the first transistor Q1 is grounded.

The low-voltage judging unit 164 comprises a third zener diode ZD3, a second transistor Q2, and a third transistor Q3.

A cathode terminal of the third zener diode ZD3 is coupled to the backup power source 900 through the terminal IN, and an anode terminal of the third zener diode ZD3 is coupled to a second terminal of the first transistor Q1. A control terminal of the second transistor Q2 is coupled to the anode terminal of the third zener diode ZD3, and a first terminal of the second transistor Q2 is grounded. A control terminal of the third transistor Q3 is coupled to a second terminal of the second transistor Q2 and is coupled to the backup power source 900 through the terminal IN. A first terminal of the third transistor Q3 is coupled to the backup power source 900 through the terminal IN, and a second terminal of the third transistor Q3 is coupled to the second terminal of the first transistor Q1. An output terminal OUT of the voltage judging unit 160 is coupled to the second terminal of the first transistor Q1 and the second terminal of the third transistor Q3.

For example, it is assumed that a breakdown voltage of the first zener diode ZD1 is 10V, a breakdown voltage of the second zener diode ZD 2 is 11V, and a breakdown voltage of the third zener diode ZD3 is 11V. If the voltage of the backup power source 900 is normal, for example if the voltage of the backup power source 900 is 18V, the third zener diode ZD 3 is conducted at this time and the second transistor Q2 is thus turned on. Consequently, the third transistor Q3 is turned on to allow the output terminal OUT to output the voltage command signal Vid to the controlling unit 130, which indicates that the backup power source 900 is in the normal state.

In addition, if the voltage of the backup power source 900 is excessively high, for example if the voltage of the backup power source 900 is 23V, the third zener diode ZD3 is conducted at this time, and the second transistor Q2 and the third transistor Q3 are thus turned on. However, since the voltage of the backup power source 900 is 23V, which is greater than a total breakdown voltage of the first zener diode ZD1 and the second zener diode ZD2, the first zener diode ZD1 and the second zener diode ZD2 are conducted. The first transistor Q1 is therefore turned on to connect a node N1 to ground. The second transistor Q2 is turned off and the third transistor Q3 is turned off consequently. In this manner, when the voltage of the backup power source 900 is excessively high, the voltage judging unit 160 will not output the voltage command signal Vid.

Additionally, if the voltage of the backup power source 900 is excessively low, for example if the voltage of the backup power source 900 is 8V, all the first zener diode ZD1, the second zener diode ZD2, and the third zener diode ZD3 are not conducted at this time. Therefore, the first transistor Q1, the second transistor Q2, and the third transistor Q3 are not turned on. In this manner, when the voltage of the backup power source 900 is excessively low, the voltage judging unit 160 will not output the voltage command signal Vid.

However, the high-voltage judging unit 162 is not limited to the embodiment shown in FIG. 5. In other embodiments, the high-voltage judging unit 162 only comprises a single zener diode (for example, only comprises the zener diode ZD1). A cathode terminal of the zener diode is coupled to the backup power source 900 through the terminal IN, and an anode terminal of the zener diode is coupled to the control terminal of the first transistor Q1. In one embodiment, it is assumed that a breakdown voltage of the single zener diode of the high-voltage judging unit 162 is equal to the total breakdown voltage of the first zener diode ZD1 and the second zener diode ZD2 shown in FIG. 5. For example, the breakdown voltage of the single zener diode of the high-voltage judging unit 162 is 22V. Hence, the breakdown voltage of the single zener diode of the high-voltage judging unit 162 is greater than a breakdown voltage of a single zener diode of the low-voltage judging unit 164 (such as 11V), and the electrical operations of the high-voltage judging unit 162 and the low-voltage judging unit 164 are similar to those described in the embodiment shown in FIG. 5. To simplify matters, a description in this regard is not provided.

In another embodiment, the low-voltage disconnect hysteresis controller 166 comprises a fourth zener diode ZD4. An anode terminal of the fourth zener diode ZD4 is coupled to the second terminal of the first transistor Q1. A cathode terminal of the fourth zener diode ZD 4 is coupled to the output terminal Out. In one embodiment, the backup power source 900 may be a battery. As mentioned previously, since the battery has the internal resistance, the oscillation phenomenon that the battery is discharged to a low voltage and cannot supply power and then supplies power again is caused. According to the present disclosure, by designing the breakdown voltage of the third zener diode ZD3 of the low-voltage judging unit 164 to be greater than a breakdown voltage of the fourth zener diode ZD4 of the low-voltage disconnect hysteresis controller 166, a difference between the breakdown voltages of the third zener diode ZD 3 and the fourth zener diode ZD4 forms the buffer range. As a result, even though the voltage of the battery rises after the battery stop discharging, the battery will not provide electric power so as to resolve the oscillation problem that occurs when the battery has a low voltage and cannot supply power.

Figure 6:
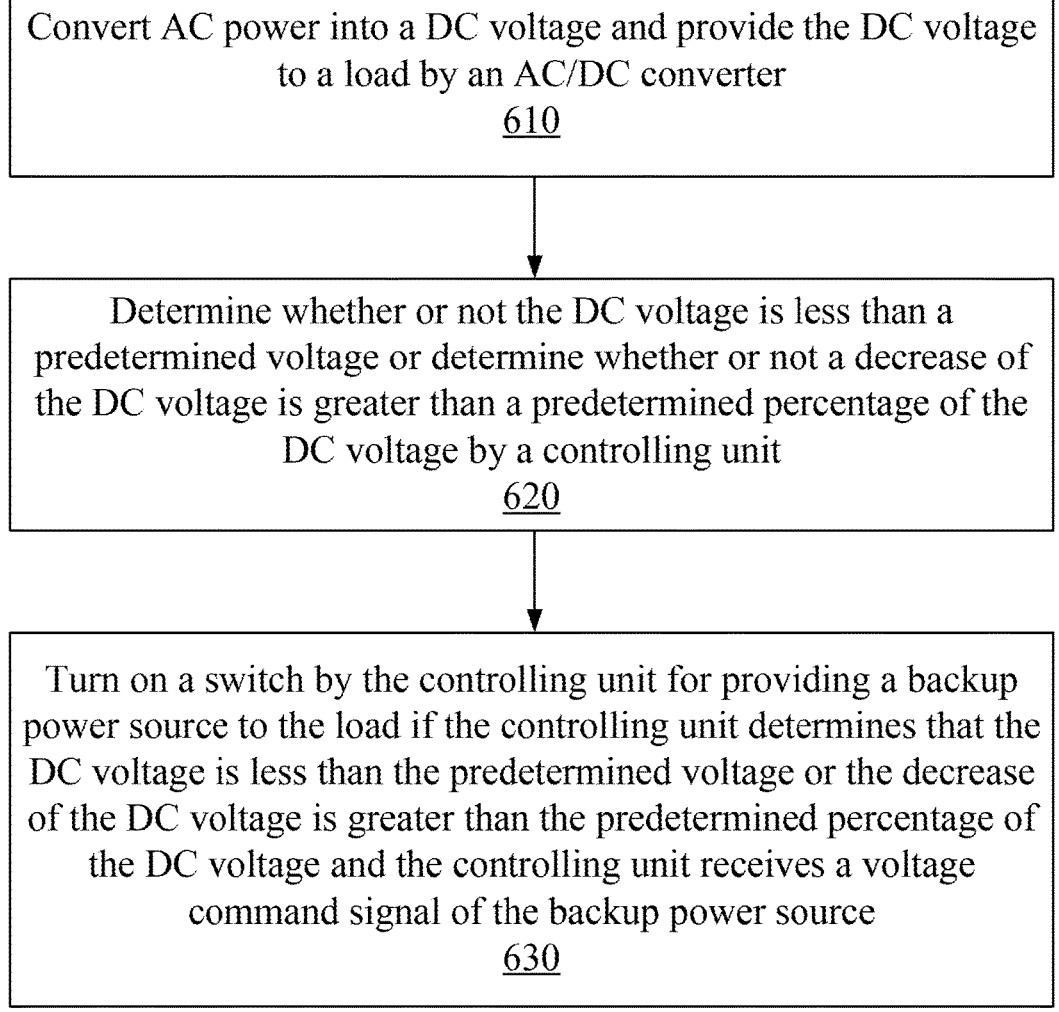
FIG. 6 depicts a flowchart of a control method of a power converting device according to yet another embodiment of this disclosure.

FIG. 6 depicts a flowchart of a control method 600 of a power converting device according to yet another embodiment of this disclosure. As shown in FIG. 6, the control method 600 of the power converting device according to the present disclosure comprises the following steps:

Step 610: convert AC power into a DC voltage and provide the DC voltage to a load by an AC/DC converter;

Step 620: determine whether or not the DC voltage is less than a predetermined voltage or determine whether or not a decrease of the DC voltage is greater than a predetermined percentage of the DC voltage by a controlling unit;

Step 630: turn on a switch by the controlling unit for providing a backup power source to the load if the controlling unit determines that the DC voltage is less than the predetermined voltage or the decrease of the DC voltage is greater than the predetermined percentage of the DC voltage and the controlling unit receives a voltage command signal of the backup power source.

In order to facilitate the understanding of the control method 600 of the power converting device according to the embodiment of the present disclosure, a description is provided with reference to FIG. 1 and FIG. 6. In step 610, the AC/DC converter 110 converts the AC power AC to the DC voltage Vdc, and provides the DC voltage Vdc to the load 800. In step 620, the controlling unit 130 determines whether or not the DC voltage Vdc is lower than the predetermined voltage or determines whether or not the decrease of the DC voltage Vdc is greater than the predetermined percentage of the DC voltage Vdc. In step 630, if the controlling unit 130 determines that the DC voltage Vdc is lower than the predetermined voltage or the decrease of the DC voltage Vdc is greater than the predetermined percentage of the DC voltage Vdc and the controlling unit 130 receives the voltage command signal Vid of the backup power source 900, the controlling unit 130 turns on the switch 120 for providing the backup power source 900 to the load 900.

The control method 600 of the power converting device according to the present embodiment judges the status of the DC voltage Vdc output by the AC/DC converter 110 to determine whether or not to perform switching so as to provide the backup power source 900 to the load 800 for use. Therefore, time required by the backup power source 900 to supply power to the load 800 is approximately zero to meet the demand of uninterrupted supply of power. In addition, the controlling unit 130 will not turn on the switch 120 for providing the backup power source 900 to the load 800 until receiving the voltage command signal Vid of the backup power source 900 according to the control method 600 of the power converting device. As a result, it is further ensured that the voltage of the backup power source 900 is within the normal range without damaging the load 800.

A description is provided with reference to FIG. 2 and step 620 in FIG. 6. The control method 600 can use the judging unit 132 of the controlling unit 130 to make a judgment on the DC voltage Vdc. If the DC voltage Vdc is less than the predetermined voltage or the decrease of the DC voltage Vdc is greater than the predetermined percentage of the DC voltage Vdc and the judging unit 132 receives the voltage command signal Vid, the judging unit 132 outputs the judging signal. The driver 134 of the controlling device 130 receives the judging signal and outputs the drive signal to the switch 120 according to the judging signal. The switch 120 is turned on according to the drive signal for providing the backup power source 900 to the load 800.

In one embodiment, the control method 600 further comprises: a current limiter preventing the AC/DC converter from supplying power to the backup power source through the switch. A description is provided with reference to FIG. 3, the current limiter 140 prevents the AC/DC converter 110 from supplying power to the backup power source 900 through the switch 120 so as to avoid damages to the backup power source 900.

In another embodiment, the control method 600 further comprises: a current limiter preventing the backup power source from supplying power to the AC/DC converter or the controlling unit through the switch. A description is provided with reference to FIG. 3. The current limiter 150 prevents the backup power source 900 from supplying power to the AC/DC converter 110 or the controlling unit 130 through the switch 120, so that extra power being provided to the AC/DC converter 110 or the controlling unit 130, which causes power consumption of the backup power source 900, is avoided. As a result, the emergency power supply time of the backup power source 900 is increased.

In still another embodiment, the control method 600 further comprises: a voltage judging unit detecting a voltage of the backup power source; and if the voltage of the backup power source is within a range of threshold voltages, outputting the voltage command signal. A description is provided with reference to FIG. 3. The voltage judging unit 160 detects the voltage of the backup power source 900. If the voltage of the backup power source 900 is within the range of threshold voltages, output the voltage command signal Vid to the controlling unit 130 to indicate that the backup power source 900 is in the normal state.

A description is provided with reference to FIG. 4. In one embodiment, the step that the voltage judging unit detects the voltage of the backup power source comprises: the high-voltage judging unit 162 of the voltage judging unit 160 determining whether or not the voltage of the backup power source 900 exceeds the predetermined upper limit value of the range of threshold voltages; the low-voltage judging unit 164 of the voltage judging unit 160 determining whether or not the voltage of the backup power source 900 is lower than the predetermined lower limit value of the range of threshold voltages; and if the voltage of the backup power source 900 does not exceed the predetermined upper limit value and is not lower than the predetermined lower limit value, the voltage judging unit 160 outputting the voltage command signal Vid to indicate that the backup power source 900 is in the normal state.

A description is provided with reference to FIG. 4. In another embodiment, the step that a high-voltage judging unit determines whether or not the voltage of the backup power source 900 exceeds the predetermined upper limit value and a low-voltage judging unit determines whether or not the voltage of the backup power source 900 is lower than the predetermined lower limit value comprises: if the voltage of the backup power source 900 exceeds the predetermined upper limit value or is lower than the predetermined lower limit value, the voltage judging unit 160 not outputting the voltage command signal Vid.

A description is provided with reference to FIG. 4. In still another embodiment, the step that the low-voltage judging unit determines whether or not the voltage of the backup power source 900 is lower than the predetermined lower limit value comprises: the low-voltage disconnect hysteresis controller 166 of the voltage judging unit 160 continuously outputting the voltage command signal Vid when the voltage of the backup power source 900 is within the buffer range lower than the predetermined lower limit value so that the controlling unit 130 continuously turns on the switch 120 for providing the backup power source 900 to the load 800.

Those of ordinary skill in the art will appreciate that each of the steps of the control method 600 of the power converting device named after the function thereof is merely used to describe the technology in the embodiment of the present disclosure in detail but not limited to. Therefore, combining the steps of said method into one step, dividing the steps into several steps, or rearranging the order of the steps is within the scope of the embodiment in the present disclosure.

The power converting device and the control method thereof according to the above embodiments may be applied but is not limited to a system having a communication function. Once a power outage occurs, the power converting device and the control method thereof can be used to provide the above system with the backup power source. The system is thus allowed to at least make an emergency call for help through the communication function. For example, dial emergency phone numbers 110, 119, etc. by using an ordinary phone or a Voice Over Internet Protocol (VoIP) phone in the system, or call the concerned units, so as to notify the concerned units to perform emergency treatment when the power outage occurs. As a result, the safety of the user is ensured.

In view of the foregoing embodiments of the present disclosure, many advantages of the present disclosure are now apparent. By judging the status of the DC voltage output by the AC/DC converter, it is determined whether or not to perform switching so as to provide the backup power source to the load for use. Therefore, time required by the backup power source to supply power to the load is approximately zero to meet the demand of uninterrupted supply of power. In addition, according to the power converting device and the control method thereof, the switch will not be turned on for providing the backup power source to the load until the voltage command signal of the backup power source is received. As a result, it is further ensured that the voltage of the backup power source is within the normal range without damaging the load.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A power converting device comprising:
   an AC/DC converter converting AC power to a DC voltage, and providing the DC voltage to a load;
   a switch coupled to a backup power source; and
   a controlling unit detecting the DC voltage provided to the load, and preforming a determination of whether the DC voltage provided to the load is less than a predetermined voltage or whether a decrease of the DC voltage provided to the load is greater than a predetermined percentage of the DC voltage provided to the load,
   wherein in response to the determination indicating that the DC voltage provided to the load is less than the predetermined voltage or the decrease of the DC voltage provided to the load is greater than a predetermined percentage of the DC voltage provided to the load and in response to a voltage command signal corresponding to the backup power source received by the controlling unit, the controlling unit turns on the switch for providing the backup power source to the load.

2. The power converting device of claim 1, wherein the controlling unit comprises:
   a judging unit making a judgment on the DC voltage provided to the load, wherein if the DC voltage provided to the load is less than the predetermined voltage or the decrease of the DC voltage provided to the load is greater than the predetermined percentage of the DC voltage provided to the load and the judging unit receives the voltage command signal, the judging unit outputs a judging signal; and
   a driver receiving the judging signal and outputting a drive signal to the switch according to the judging signal, the switch being turned on according to the drive signal for providing the backup power source to the load.

3. The power converting device of claim 1, further comprising:
   a current limiter coupled between the switch and an output terminal of the AC/DC converter and used for preventing the AC/DC converter from supplying power to the backup power source through the switch.

4. The power converting device of claim 1, further comprising:
   at least one diode comprising:
     an anode terminal coupled to the switch; and
     a cathode terminal coupled to an output terminal of the AC/DC converter.

5. The power converting device of claim 1, further comprising:
   a current limiter coupled between the switch and an output terminal of the AC/DC converter and used for preventing the backup power source from supplying power to the AC/DC converter or the controlling unit through the switch.

6. The power converting device of claim 1, further comprising:
   at least one diode comprising:
     an anode terminal coupled to an output terminal of the AC/DC converter; and
     a cathode terminal coupled to the switch.

7. The power converting device of claim 1, wherein the power converting device further comprises:
   a voltage judging unit detecting a voltage of the backup power source, wherein if the voltage of the backup power source is within a range of threshold voltages, the voltage judging unit outputs the voltage command signal.

8. The power converting device of claim 7, wherein the voltage judging unit comprises:
   a high-voltage judging unit determining whether or not the voltage of the backup power source exceeds a predetermined upper limit value of the range of threshold voltages; and
   a low-voltage judging unit determining whether or not the voltage of the backup power source is lower than a predetermined lower limit value of the range of threshold voltages;
   wherein if the voltage of the backup power source does not exceed the predetermined upper limit value and is not lower than the predetermined lower limit value, the voltage judging unit outputs the voltage command signal.

9. The power converting device of claim 8, wherein the voltage judging unit does not output the voltage command signal if the voltage of the backup power source exceeds the predetermined upper limit value or is lower than the predetermined lower limit value.

10. The power converting device of claim 8, wherein the low-voltage judging unit comprises:
    a low-voltage disconnect hysteresis controller continuously outputting the voltage command signal when the voltage of the backup power source is within a buffer range lower than the predetermined lower limit value to allow the controlling unit to continuously turn on the switch for providing the backup power source to the load.

11. The power converting device of claim 7, wherein the voltage judging unit comprises:
    a high-voltage judging unit comprising:
      a first zener diode, a cathode terminal of the first zener diode being coupled to the backup power source; and
      a first transistor, a control terminal of the first transistor being coupled to an anode terminal of the first zener diode, a first terminal of the first transistor being grounded;
    a low-voltage judging unit comprising:
      a second zener diode, a cathode terminal of the second zener diode being coupled to the backup power source;
      a second transistor, a control terminal of the second transistor being coupled to an anode terminal of the second zener diode and a second terminal of the first transistor, a first terminal of the second transistor being grounded; and
      a third transistor, a control terminal of the third transistor being couple to a second terminal of the second transistor, a first terminal of the third transistor, and the backup power source, a second terminal of the third transistor being coupled to the second terminal of the first transistor and an output terminal.

12. The power converting device of claim 11, wherein a breakdown voltage of the first zener diode is greater than a breakdown voltage of the second zener diode.

13. The power converting device of claim 11, wherein the voltage judging unit further comprises:
a low-voltage disconnect hysteresis controller comprising:
a third zener diode, an anode terminal of the third zener diode being coupled to the second terminal of the first transistor, a cathode terminal of the third zener diode being coupled to the output terminal, wherein a breakdown voltage of the second zener diode is greater than a breakdown voltage of the third zener diode.

14. A control method of a power converting device comprising:
converting AC power into a DC voltage and providing the DC voltage to a load by an AC/DC converter;
detecting the DC voltage provided to the load, and preforming a determination of whether or not the DC voltage provided to the load is less than a predetermined voltage or whether or not a decrease of the DC voltage provided to the load is greater than a predetermined percentage of the DC voltage provided to the load by a controlling unit; and
turning on a switch by the controlling unit for providing a backup power source to the load in response to the determination indicating that the DC voltage provided to the load is less than the predetermined voltage or the decrease of the DC voltage provided to the load is greater than the predetermined percentage of the DC voltage provided to the load and in response to a voltage command signal corresponding to the backup power source received by the controlling unit.

15. The control method of claim 14, wherein determining whether or not the DC voltage provided to the load is less than the predetermined voltage or determining whether or not the decrease of the DC voltage provided to the load is greater than the predetermined percentage of the DC voltage provided to the load by the controlling unit comprises:
making a judgment on the DC voltage provide to the load by a judging unit of the controlling unit, if the controlling unit determines that the DC voltage provided to the load is less than the predetermined voltage or the decrease of the DC voltage provide to the load is greater than the predetermined percentage of the DC voltage provided to the load and the judging unit receives the voltage command signal, the judging unit outputting a judging signal; and
receiving the judging signal and outputting a drive signal to the switch according to the judging signal by a driver of the controlling unit, the switch being turned on according to the drive signal for providing the backup power source to the load.

16. The control method of claim 14, further comprising:
preventing the AC/DC converter from supplying power to the backup power source through the switch by a current limiter.

17. The control method of claim 14, further comprising:
preventing the backup power source from supplying power to the AC/DC converter or the controlling unit through the switch by a current limiter.

18. The control method of claim 14, wherein the control method further comprises:
detecting a voltage of the backup power source by a voltage judging unit; and
outputting the voltage command signal if the voltage of the backup power source is within a range of threshold voltages.

19. The control method of claim 18, wherein detecting the voltage of the backup power source by the voltage judging unit comprises:
determining whether or not the voltage of the backup power source exceeds a predetermined upper limit value of the range of threshold voltages by a high-voltage judging unit of the voltage judging unit;
determining whether or not the voltage of the backup power source is lower than a predetermined lower limit value of the range of threshold voltages by a low-voltage judging unit of the voltage judging unit; and
outputting the voltage command signal by the voltage judging unit if the voltage of the backup power source does not exceed the predetermined upper limit value and is not lower than the predetermined lower limit value.

20. The control method of claim 19, wherein detecting the voltage of the backup power source by the voltage judging unit comprises:
the voltage judging unit not outputting the voltage command signal if the voltage of the backup power source exceeds the predetermined upper limit value or is lower than the predetermined lower limit value.

21. The control method of claim 19, wherein determining whether or not the voltage of the backup power source is lower than the predetermined lower limit value by the low-voltage judging unit comprises:
continuously outputting the voltage command signal by a low-voltage disconnect hysteresis controller of the voltage judging unit when the voltage of the backup power source is within a buffer range lower than the predetermined lower limit value to allow the controlling unit to continuously turn on the switch for providing the backup power source to the load.

* * * * *